US011900125B1

(12) United States Patent
Ramana et al.

(10) Patent No.: US 11,900,125 B1
(45) Date of Patent: Feb. 13, 2024

(54) INTEGRATED DELIVERY PLATFORM FOR ENTERPRISE SOFTWARE DEVELOPMENT AT A COMPUTING DEVICE

(71) Applicant: The Anthem Companies, Inc., Indianapolis, IN (US)

(72) Inventors: Deepak Ramana, Bengaluru (IN); Korgi Akshatha Rai, Mason, OH (US); Subhash Battepati, Mason, OH (US); Srini Pingali, Glen Allen, VA (US); Varun Chibber, Mason, OH (US)

(73) Assignee: The Anthem Companies, Inc., Indianapolis, IN (US)

( * ) Notice: Subject to any disclaimer, the term of this patent is extended or adjusted under 35 U.S.C. 154(b) by 225 days.

(21) Appl. No.: 17/300,942

(22) Filed: Dec. 15, 2021

Related U.S. Application Data

(60) Provisional application No. 63/125,967, filed on Dec. 15, 2020.

(51) Int. Cl.
| | |
|---|---|
| *G06F 9/4401* | (2018.01) |
| *G06Q 10/101* | (2023.01) |
| *G06F 21/62* | (2013.01) |
| *G06Q 10/10* | (2023.01) |

(52) U.S. Cl.
CPC ........ *G06F 9/4401* (2013.01); *G06F 21/6218* (2013.01); *G06Q 10/101* (2013.01); *G06Q 10/103* (2013.01)

(58) Field of Classification Search
None
See application file for complete search history.

(56) References Cited

U.S. PATENT DOCUMENTS

| | | | | |
|---|---|---|---|---|
| 2019/0187982 | A1* | 6/2019 | Mathew | G06F 8/71 |
| 2021/0149648 | A1* | 5/2021 | Velammal | G06N 20/00 |
| 2021/0377363 | A1* | 12/2021 | Garaga | H04L 41/085 |
| 2021/0385332 | A1* | 12/2021 | Edamadaka | G06F 9/547 |

\* cited by examiner

*Primary Examiner* — Qing Chen
(74) *Attorney, Agent, or Firm* — Morgan, Lewis & Bockius LLP

(57) ABSTRACT

An integrated delivery platform for enterprise software development is provided. The platform includes services and scheduling capabilities for bootstrapping and scheduling software microservices. The platform is capable of handling both conventional software development and Artificial Intelligence (AI) software. Some implementations include a framework for operational environment in the cloud, a workflow automation and environment bootstrapping engine and a code generation engine, and a repository for publishing and downloading multi-modal components (e.g., data sets, machine learning models, API, applications, and integration solutions), and facilitates software reuse. The bootstrapping process kick starts a scalable platform that avoids manual handoffs.

20 Claims, 14 Drawing Sheets

Sample Meta-data api:

```
"entityName": "member",
"entityType": "model/dataset",
"entityVersion": "1.0",
"specification": "<db spec – swagger/schema>",
"connectionInfo": "<pointer to vault repo>"
```

Figure 2B

Sample Vault kv:
{
"url": "aistage.workos.com:3553.3",
"db_name": "foryoureyesonly",
"username": "whoami",
"password": "n1c3try"
}

Figure 3B

INTEGRATED DELIVERY PLATFORM FOR ENTERPRISE SOFTWARE DEVELOPMENT AT A COMPUTING DEVICE

TECHNICAL FIELD

The disclosed implementations relate generally to software platforms and more specifically to an integrated delivery platform for different industries.

BACKGROUND

Enterprise software continues to grow in complexity and variety. To develop such software, companies employ a large number of application teams, including product teams and technical teams, with inter-team dependencies, that are increasingly difficult to manage. At the same time, conventional software is now complemented with Artificial Intelligence (AI) solutions (e.g., machine learning software). AI software development is complex and consuming, and traditional workflow management software makes value realization of AI a time-consuming And complex process. Software security remains a critical component of enterprise software management. While the faster pace of innovation requires quicker turnarounds and faster experimentation, there are no marketplaces for showcasing and consumption of available artifacts as plug and play components, thereby increasing costs, and time to market. With different goals, different teams engage in disconnected processes and maintenance routines, due to non-standard approaches and a lack of guardrails. Enterprise organizations are seeing too many manual handoffs, due to involvement of different teams and technology stacks in enterprise-to-enterprise (E2E) solutions. There is also a lack of centralized and standardized software governance (e.g., code coverage, automated tracking of quality assurance (QA) and performance, release management), and a higher ramp up time for new developers or teams. Current products available in the market do not solve many of the issues described above. Existing integrated development environment (IDE) frameworks have capabilities for extending the functionality of a specific IDE. For example, the Eclipse IDE has a plug-in architecture that enables IDE developers to develop new components that extend or enhance the IDE's capabilities. But these IDE frameworks are not designed to solve productivity problems emanating from the tasks of integrating multiple technology frameworks (e.g., machine learning algorithms, data models, shared logic-API, and user interface).

SUMMARY

Accordingly, there is a need for a new multi modal framework to integrate domain specific (e.g., AI, API, and user interface (UI)) frameworks to enable the creation of logic and data components and assembly of components into applications. In some implementations, the multi-modal framework should be capable of bootstrapping a complete, multi-modal (ML, API, UI) application. The techniques described herein can be used to implement the multi-modal framework. Some implementations use three frameworks— ACS (a framework for operational environment in the cloud), ADS (a workflow automation and environment bootstrapping engine and a code generation engine), and a repository for publishing and downloading multi-modal components (e.g., data sets, machine learning models, APIs, applications, and integration solutions). The repository is associated with a governance process that flags components as reusable assets. The integrated web-based platform according to the techniques described herein provide product and technical teams a one stop shop for all their development and delivery needs with baked-in autonomy, governance, and compliance. Using the platform, bootstrapping an application can be accomplished in minutes rather than days, by automating the workflow with inbuilt governance. According to some implementations, the solution takes into account a wide variety of personas and platforms. Some implementations provide flexibility to teams/platforms to implement their changes with multi-tenancy and custom orchestrations. Some implementations remove pain points in terms of time and effort needed for repetitive actions, while maintaining the software teams' autonomy. The techniques described herein can be used for easy on-boarding of vendors and development partners. Any large enterprise which is doing in-house development can potentially use these techniques to solve their delivery challenges. The techniques can also be useful for healthcare organizations, due to baked in compliance models with healthcare regulations.

In one aspect, some implementations include a computer-implemented method of providing an integrated delivery platform for enterprise software development. The method is executed at a computing device coupled to one or more memory units each operable to store at least one program. The method is additionally or alternatively executed at one or more servers having at least one processor communicatively coupled to the one or more memory units, in which the at least one program, when executed by the at least one processor, causes the at least one processor to perform the method.

In another aspect, some implementations include a system configured to perform any of the methods described herein.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 2B shows an example metadata API, according to some implementations.

FIG. 3B shows a sample Vault key value command group, according to some implementations.

DETAILED DESCRIPTION

Figure 1A:
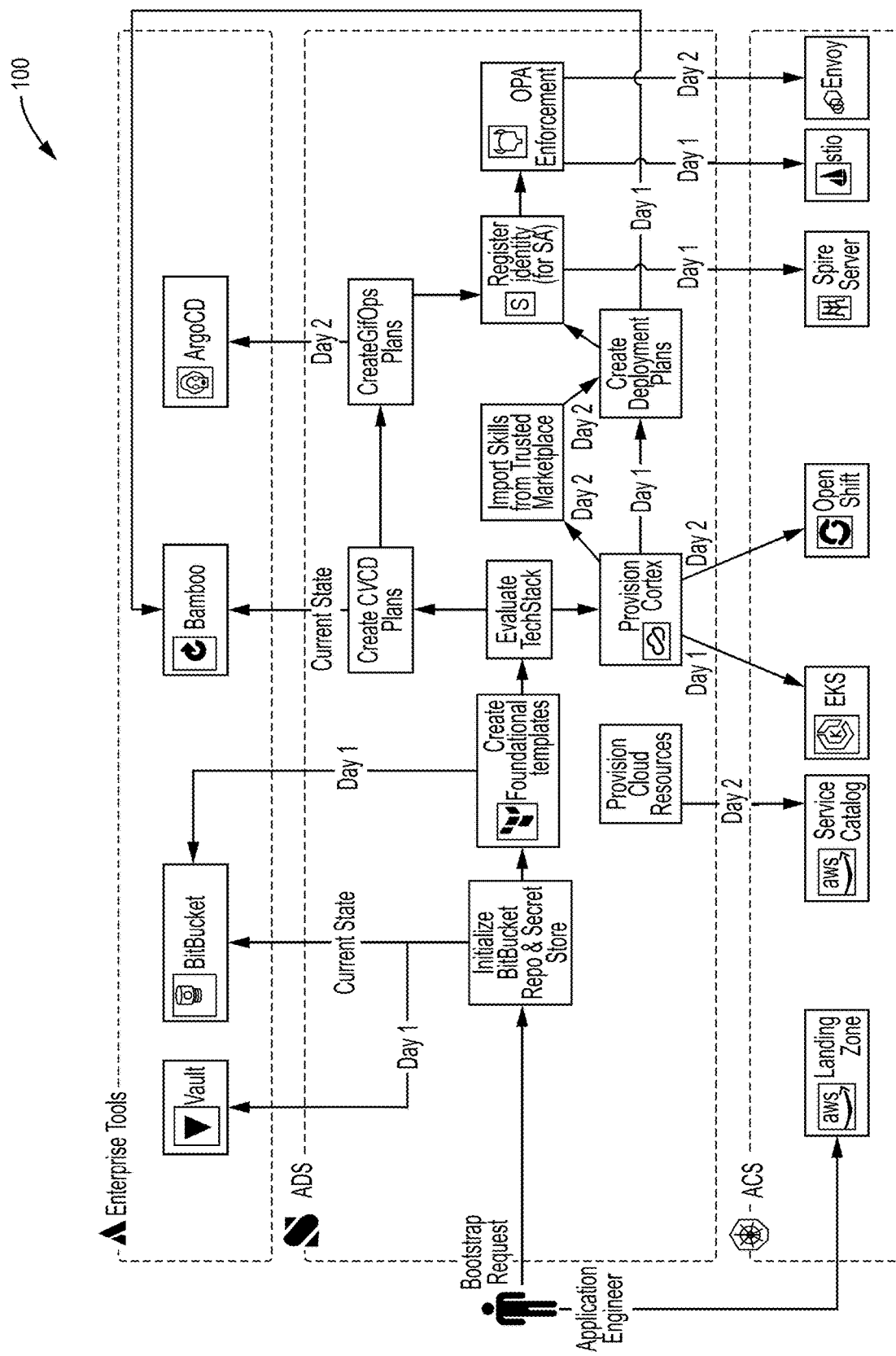
FIG. 1A is an illustration of an example Work Operating System, according to some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Some implementations solve the problems described in the Summary section end-to-end by taking into account the journey of different personas (involved in delivery lifecycle) from inception to delivery, and provide plug and play solutions for different teams/platforms to optimize their delivery process. Some implementations provide a platform that creates a community of solution providers spread across different personas to come together, share assets and build value add products. Some implementations optimize the end to end development and delivery process by way of automation. Some implementations use a definition of the personas with detailed steps of journey of each of those personas.

FIG. 1A is an illustration of an example Work Operating System 100, according to some implementations. In some implementations, application engineers use a landing zone to provision an account for their area of responsibility on an automatic configuration server (sometimes called the ACS), and subsequently submit a request for a microservice that invokes a bootstrap workflow on an application developer suite (sometimes called the ADS). In some implementations, the bootstrap workflow includes one or more of the following stages selected based on one or more properties of the request (e.g., selected microservice, application type, sensitive or private information): (i) automatic provisioning of a source code repository to house the development artifacts; (ii) provisioning of a namespace/sub-namespace in secrets manager for centralized management of application specific secrets with frequent and systematic password rotation; (iii) creating (e.g., by the ADS) the starter scripts to provision cloud resources leveraging the established common design patterns with embedded security standards; (iv) provisioning (e.g., by the ADS) a new instance of Cortex (or similar platform for deploying, managing, and scaling machine learning) or create a new tenant in an existing Cortex instance as needed; and (v) orchestrating (e.g., by the ADS) with ACS to register a workload identifier and author policies to support a zero-trust security model. In some implementations, automatic provisioning of a source code repository to house the development artifacts includes initializing a Bitbucket repository (or a similar code repository) and secret store (e.g., Vault). In some implementations, provisioning of a namespace/sub-namespace in secrets manager for centralized management of application specific secrets with frequent and systematic password rotation includes performing Open Policy Agent (OPA) enforcement operations. As shown in FIG. 1A, in some implementations, when a user (e.g., an application engineer) initiates a bootstrap request, the system initializes a Bitbucket repository (or a similar code repository) and secret store (e.g., Vault), creates foundational templates, evaluates technology stack to provision Cortex, and/or creates Continuous Integration (CI) or Continuous Deployment (CD) plans, creates deployment plans, creates GitOps plans (or similar plans for Continuous Deployment for cloud native applications), registers identity, and/or performs Open Policy Agent (OPA) enforcement operations. Subsequently (e.g., on a different day, or during a different time interval), the system provisions cloud resources, imports skills from a trusted marketplace and creates deployment plans, and/or performs other enforcement operations, according to some implementations.

According to some implementations, a centralized platform is provided for software development, when multiple teams are on-boarded. Depending on the type of development, some implementations bootstrap a complete platform for the development. For example, if a tenant or team is developing conventional software (software that is not AI/ML software), an appropriate platform is provided for the development. In FIG. 1A, for example, a platform based on EKS (or a similar managed service) or Open Shift (or a similar Kubernetes platform) is created and provided for the development. For development of cognitive software (sometimes called AI/ML software), some implementations provision and bootstrap Cortex or a similar platform for development. Some implementations use enterprise tools (e.g., Vault, Bitbucket, Bamboo, ArgoCD, Jira, Checkmarx) to expedite the development.

Some implementations use predetermined templates (e.g., templates based on developer/team generated scripts or templates from prior engagements with the platform, across teams) for bootstrapping, based on the type of software development. The bootstrapping process expedites development of a scalable platform that avoids manual handoffs, supports conventional software (e.g., Java, Bison) as well as AI/ML development, and facilitates reusability of assets. Once the bootstrapping completes, for each application, a template is selected from a repository of templates, based on the type of application, and business- and application-specific logic are packaged and provided for the application. Some implementations provide capabilities for moving the application from one environment to another, to maintain governance. Some implementations prepare applications for production. Some implementations provide dashboards that show operational information for multiple software teams. In some implementations, when new applications are onboarded, the applications are identified in a security-related registry, so that an Open Policy Agent (OPA) can enforce security policies without manually having to enforce security policies.

Some implementations include a component (sometimes called ACS) that provides Zero Trust Identity, workload-based declarative policy, automation, and/or NSM. ACS provides a foundational access infrastructure to empower the next generation of applications and their models, according to some implementations. ADS provides API designers, application developers, DevOps engineers, release engineers, low/no code options for developers, by sourcing data components and building code within the Work Operating System canvas. ADS also provides the ability to and/or automates review, and approves creations for production, according to some implementations. In some implementations, ADS provides a self-service portal for API and/or proxy management (e.g., apigee), environment setup and bootstrapping (e.g., Bitbucket, Bamboo, Jira, mongoDB), Continuous Integration (CI) or Continuous Deployment (CD) and programming (e.g., Angular, nodeJS, Python, Golang), and/or platform management (e.g., Docker, mongoDB, Tableau, kubernetes, Lambda, CognitiveScale). Some implementations include AutoML (sometimes called MAD/MAT) tools for data scientists, data engineers, and/or AI engineers, a toolset that streamlines and standardizes AI model development for common use cases. In some implementations, AI/ML components are published in a marketplace, and campaign designers, AI engineers, and business owners can source ready-to-use components from marketplace to create custom campaigns.

Figure 1B:
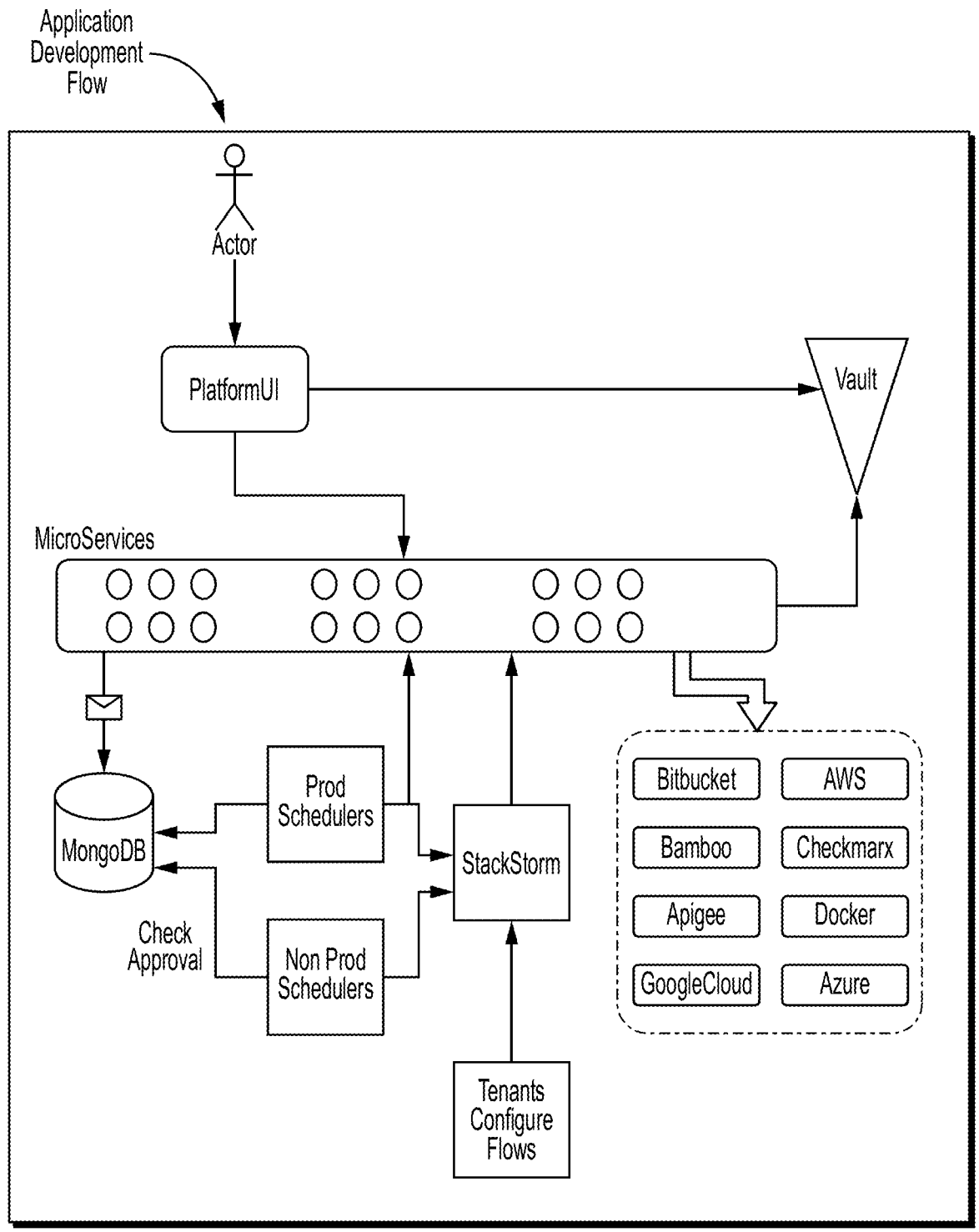
FIG. 1B shows an example flow diagram for application development, according to some implementations.

FIG. 1B shows an example flow diagram for application development, according to some implementations. A user (sometimes called an actor) logs into the platform (e.g., using a platform user interface (PlatformUI)) and submits a request for a microservice. Some implementations provide a centralized repository of workflows, while providing flexibility for developer teams. Some implementations provide a multi-tenant platform. In some implementations, each tenant has a separate administrator, but tenants can share common resources. Some implementations include one or more schedulers (e.g., a production scheduler for deployment, a non-production scheduler for bootstrapping) that process incoming requests, at predetermined time intervals (e.g., every 15 minutes). The schedulers can process multiple types of requests during each time interval. The schedulers call different automation APIs (e.g., StackStorm APIs or similar DevOps automation APIs) based on the microservices selected by the user in the requests. In some implementations, the production schedulers take into account human feedback before scheduling deployment, whereas non-production schedulers are automated. In some implementations, the workflow automation APIs include actions, such as bootstrapping requests, corresponding to each tenant. Some implementations identify scenarios and/or use cases, for container-based software templates, and define base templates for DevOps automation API or StackStorm API invocation. In this sense, ADS includes microservices and automatic scheduling of StackStorm APIs based on predefined templates, for different technology stacks. For a new technology stack, a team provides a list of required microservices, and one or more templates are constructed based on the required microservices. For subsequent instances of the technology stack, the system automatically selects the corresponding templates.

Figure 1C:
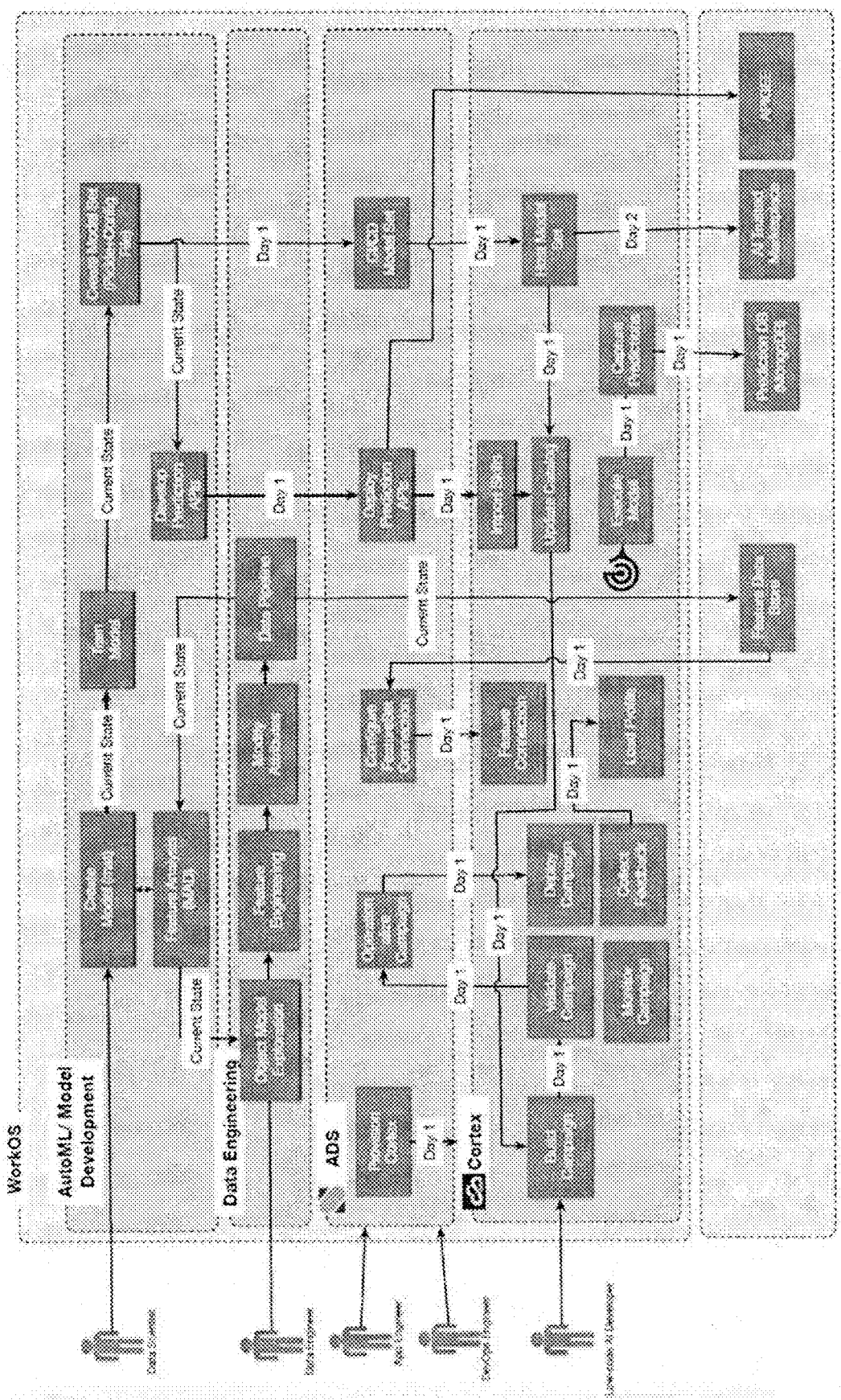
FIG. 1C is another illustration of the example Work Operating System shown in FIG. 1A, according to some implementations.

FIG. 1C is another illustration of the example Work Operating System 100 shown in FIG. 1A, according to some implementations. FIG. 1C shows AI development experience on the Work Operating System 100. Conventional software development entails an application that is built to a specification and includes a quality assurance process that confirms that the output of the software developed conforms to the specification. In contrast, for AI/ML development, there is no output for each model, and the predictions are compared to known output. Data scientists engage in model development and leverage AutoML (MAT) tooling to develop and train the models. This tool also provides support for feature analysis and creation of prediction APIs. Data engineers leverage AutoML (MAD) tooling for feature engineering, object model exploration, and creation of a Data Pipeline to feed Feature Data Store. Developers of all technology stacks leverage the Application Developer Suite (ADS) to provision the compute resources on cloud via ACS, create DevOps accelerators and develop APIs/application stacks to support the data ingestion into Cortex platform. ADS also orchestrates the provisioning of Cortex instances with multiple tenants. Cortex provides the capabilities of developing AI campaigns/missions on top of models and predictions created by AutoML. Cortex also provides a runtime environment to execute the ML models. Some implementations map MAD/MAT output to microservices which are then mapped to the Cortex runtime.

Figure 2A:
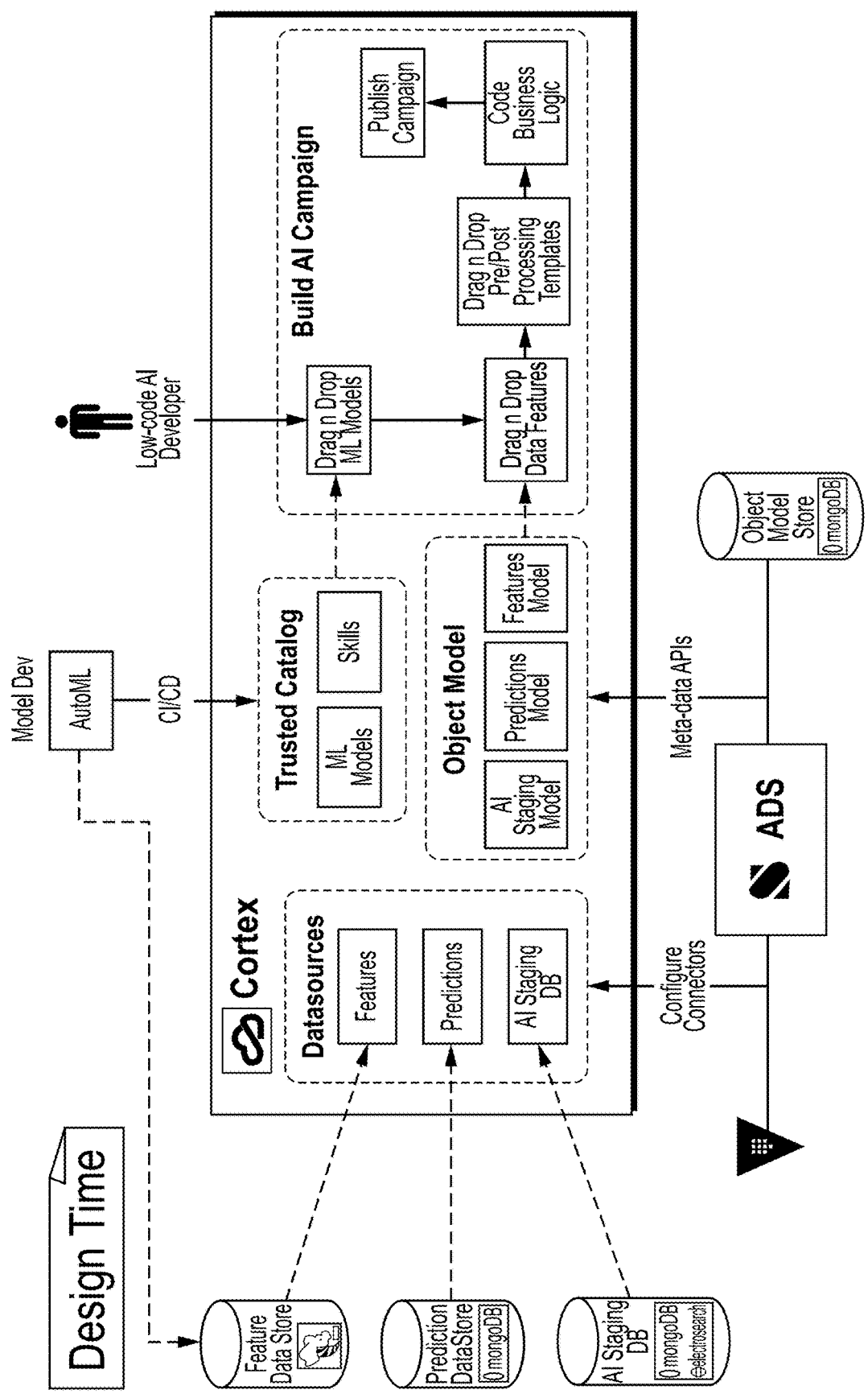
FIG. 2A illustrates an example data strategy during design time, according to some implementations.

FIG. 2A illustrates an example data strategy during design time, when utilizing the Work Operating System 100 described above, according to some implementations. ML models and API Skills are available in a trusted Catalog. Campaign developers build solutions stitching ML Models, Skills and Object Model attributes. ADS configures database connectors in Cortex, with connection credentials managed via Vault. ADS provides metadata API to build drag-and-drop object model in Cortex. In some implementations, domain object model includes member, claim structures to support pre-processing needs. AI object model includes intervention, prediction, and/or reference structures to support pre- and post-processing needs. Feature object model includes structures defined by data engineers to support ML model execution. Streamlined change management process is implemented for the structure changes. Model versioning is leveraged to insulate production campaigns from object model changes. FIG. 2B shows an example metadata API, according to some implementations.

Figure 3A:
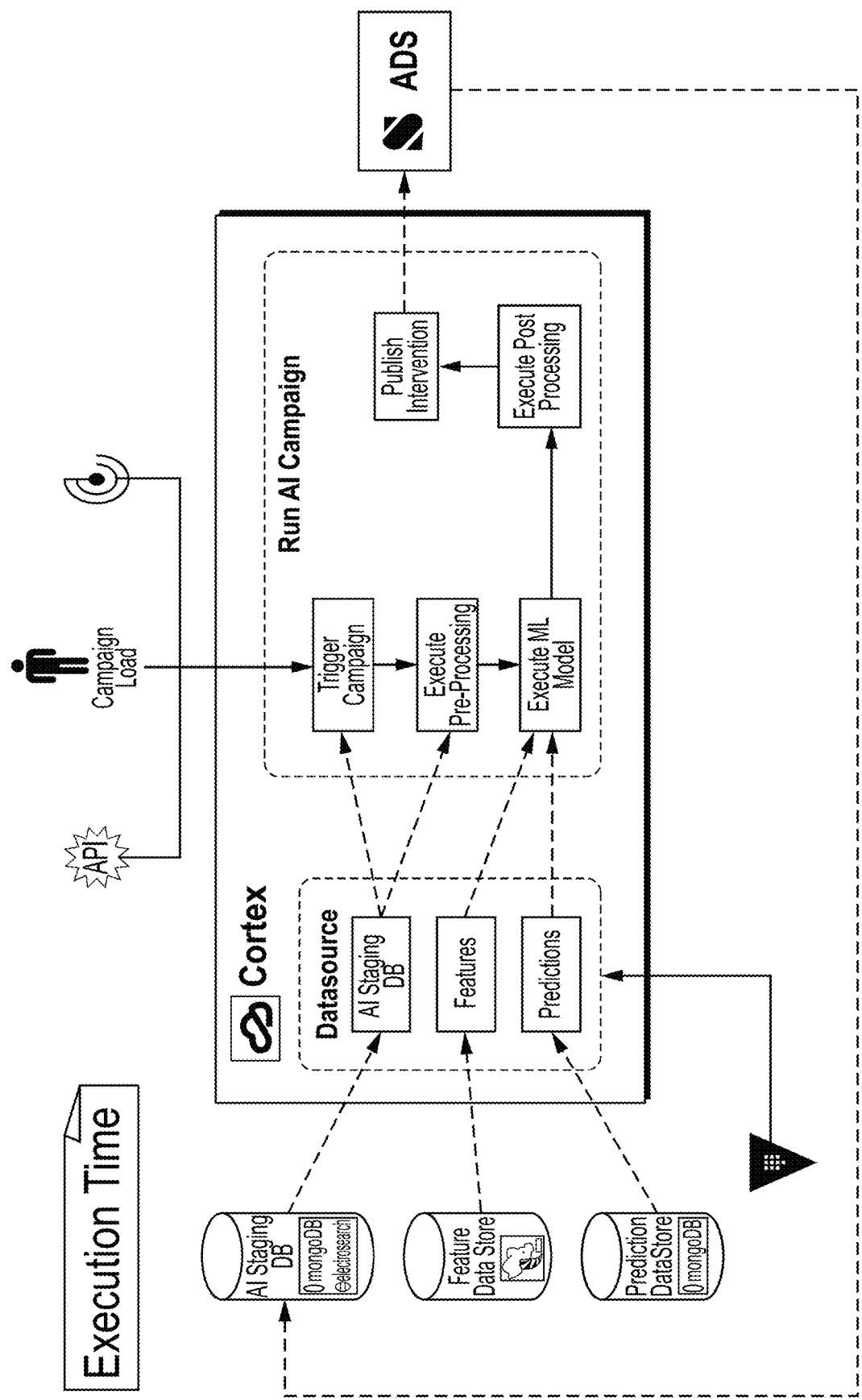
FIG. 3A illustrates an example data strategy during execution time, according to some implementations.

FIG. 3A illustrates an example data strategy during execution time, when utilizing the Work Operating System 100 described above, according to some implementations. Some implementations use an AI staging database that is replicated from EHUB/EDP and BDF. The AI staging database serves as a home for domain and intervention data needed by AI campaigns. In some implementations, the AI staging database is on-premises. In other implementations, the AI staging database is hosted on a cloud. A database (e.g., a MongoDB) provides storage. Some implementations use ElasticSearch that provides indexing support. Some implementations perform data tokenization. In some implementations, pre-processing and post-processing is performed with a direct connection to the AI staging database. The AI staging database and a prediction marketplace have APIs in addition to direct connect. In some implementations, batch campaign leverages direct database access while real-time campaigns (e.g., action triggered when member logs in) utilize APL Some implementations perform measurement of AI campaigns. FIG. 3B shows a sample Vault key value command group for interacting with Vault's key/value secret engine, according to some implementations.

Figure 4A:
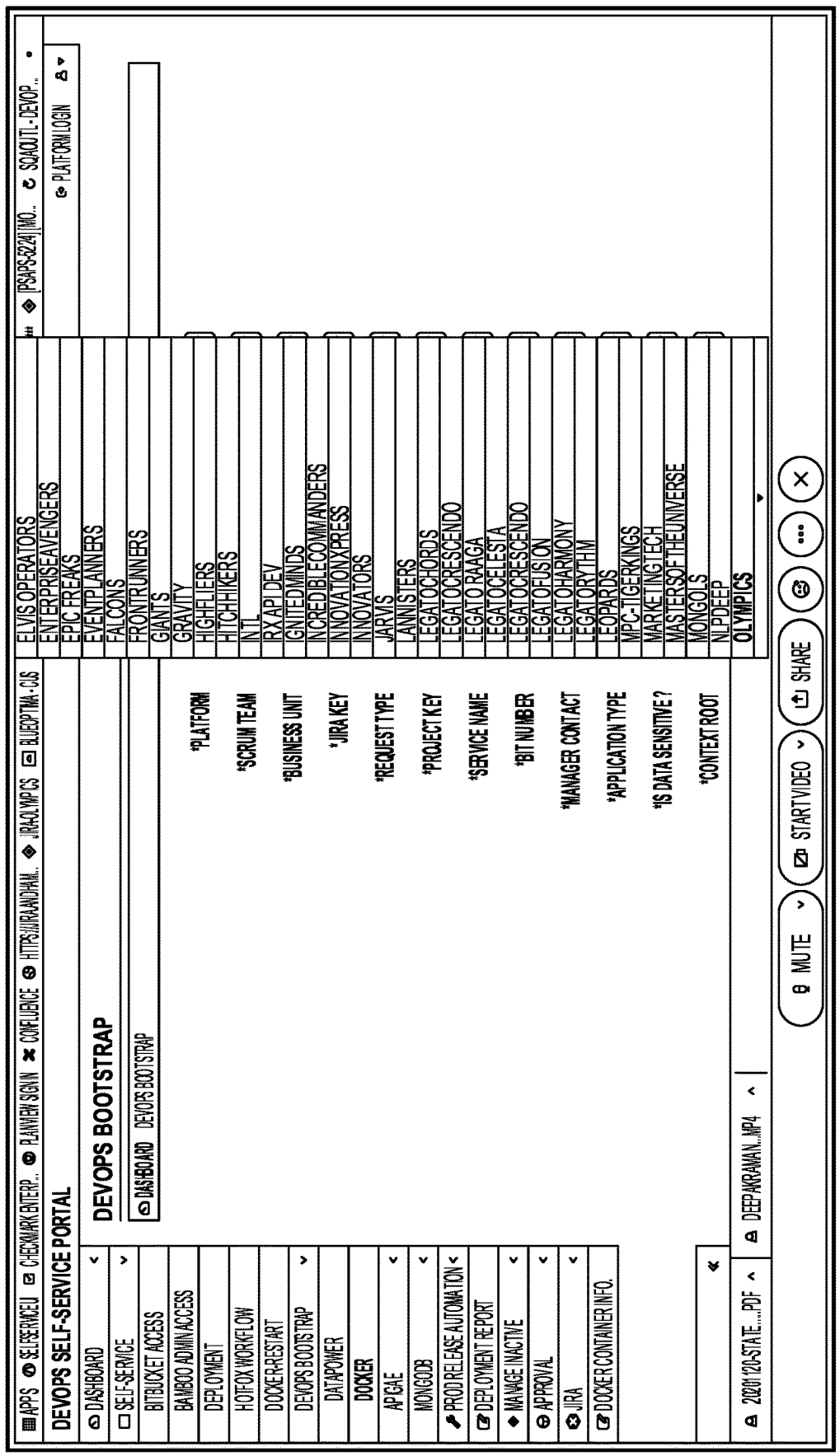
FIG. 4A shows an example user interface for the bootstrap process, according to some implementations.

FIG. 4A shows an example user interface for a self-service portal for bootstrapping applications and deployment, according to some implementations. Suppose a new developer is on-boarded and sets out to develop a microservice. Using the self-service portal, such as the user interface in FIG. 4A, the user selects a scrum team, a business unit, an enterprise security team, a test project within a Bitbucket process, a demo service, an application type, specification to indicate if the application accesses sensitive data, and/or a template for the application type. When the service request is submitted, some implementations generate an email with an approval. Some implementations notify the scrum team and/or an owner of the scrum team to login to the portal and/or approve the request. Some implementations allow the developer to save the selection to a database (e.g., a MongoDB). In this way, several developers can log into the portal and submit requests. Some implementations submit the request to a Docker platform if the developer requested the bootstrapping to happen in a Docker container. Some implementations create a repository (e.g., a Bitbucket repository), a Bamboo plan (or a build plan for a similar continuous integration and deployment tool), and associate the Bitbucket repository to the Bamboo plan.

Figure 4B:
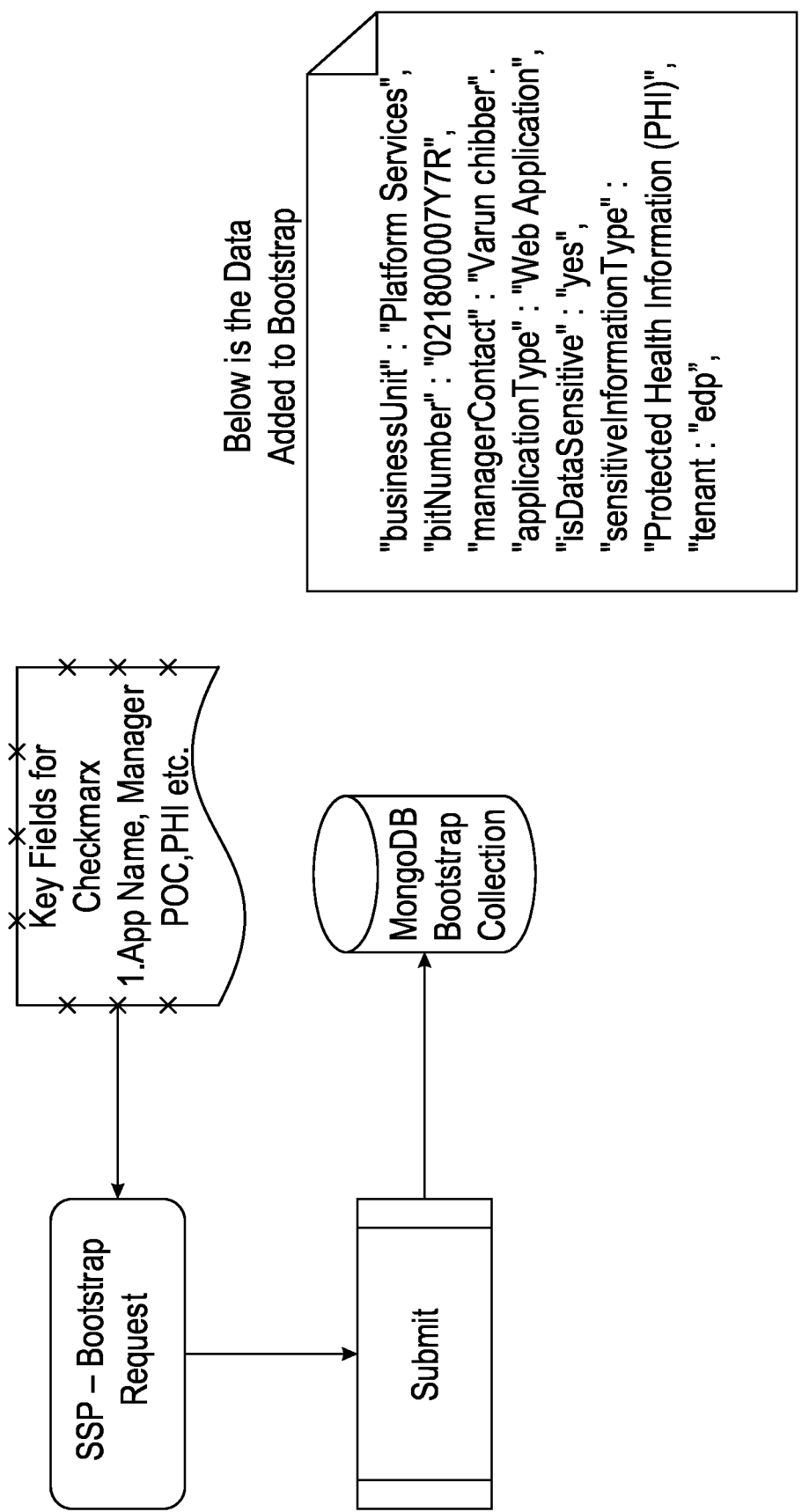
FIG. 4B shows an example of submission of a bootstrap request, according to some implementations.

FIG. 4B shows an example of submission of a bootstrap request, according to some implementations.

Figure 5A:
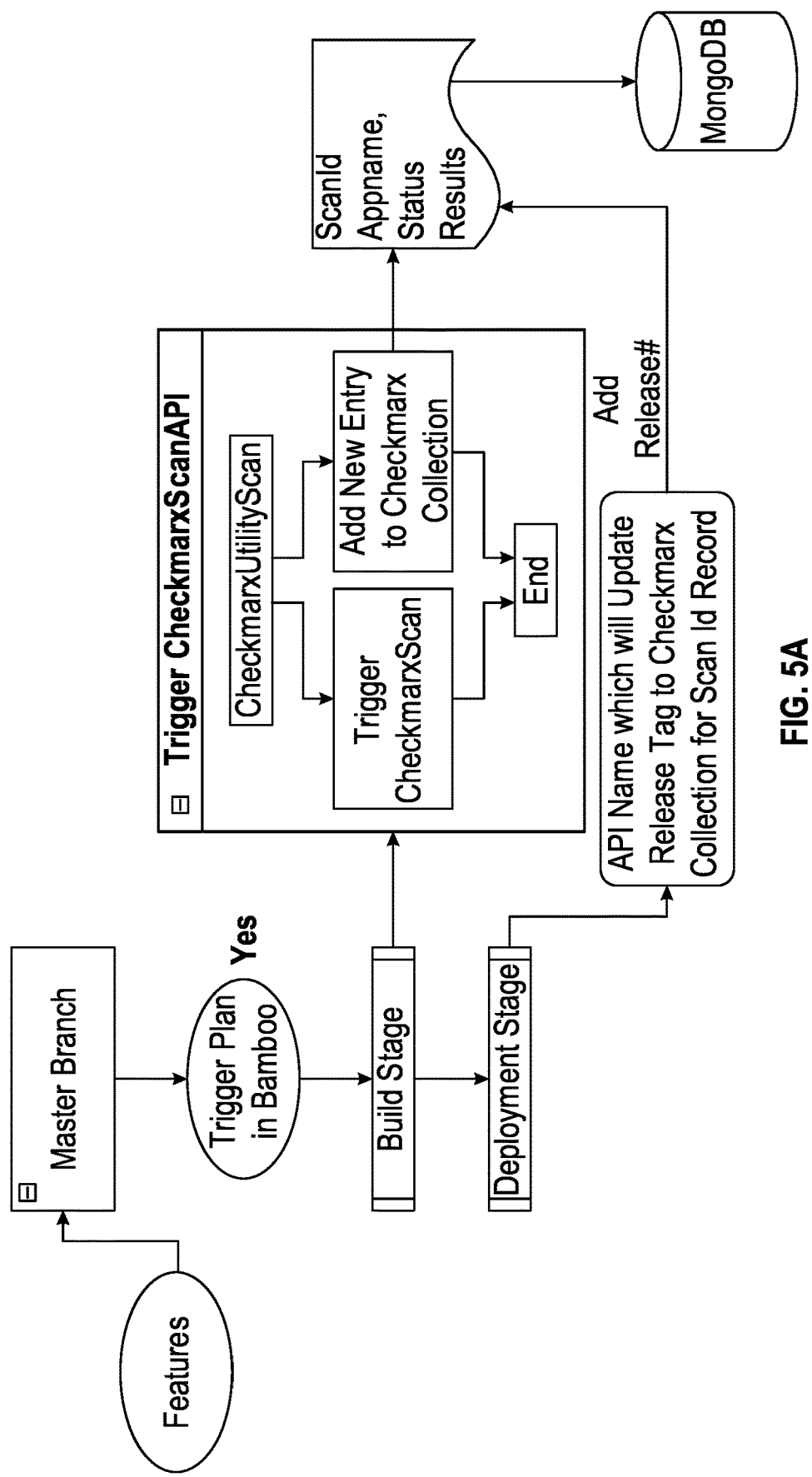
FIG. 5A shows a flowchart of an example process for software build and deployment, according to some implementations.

FIG. 5A shows a flowchart of an example process for software build and deployment, according to some implementations.

Figure 5B:
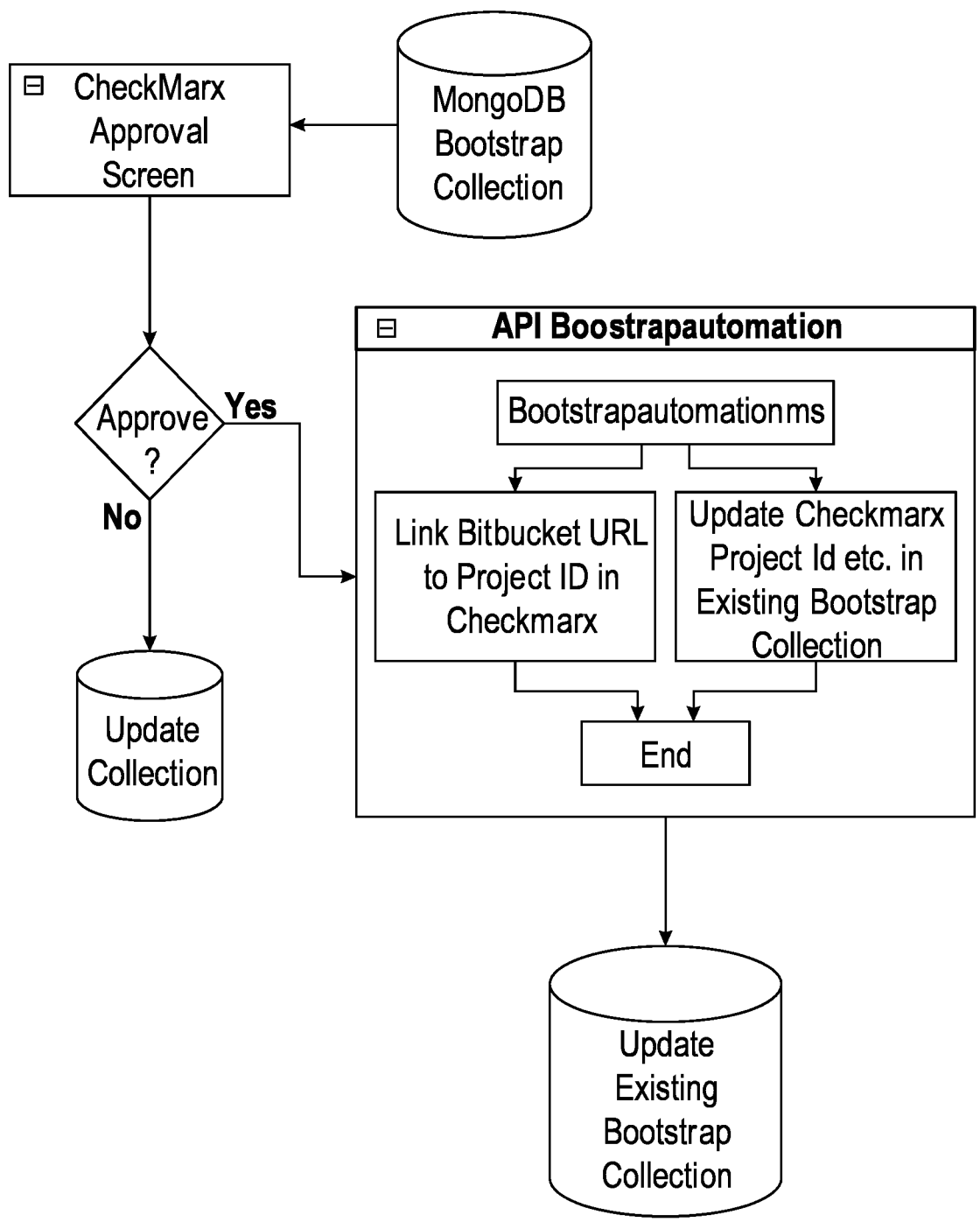
FIG. 5B shows an example bootstrap automation, according to some implementations.

FIG. 5B shows an example bootstrap automation, according to some implementations.

Figure 6A:
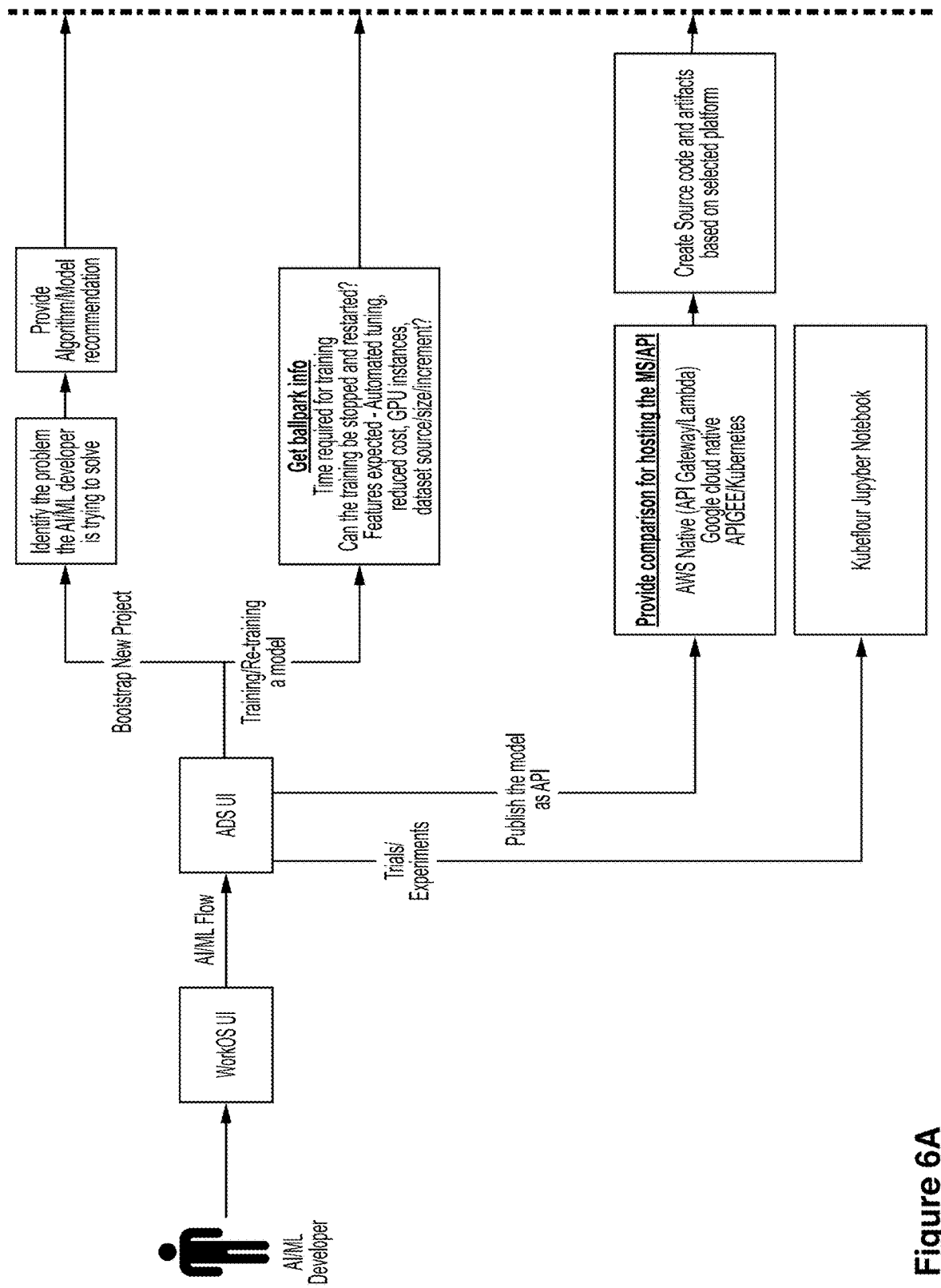
FIG. 6 shows an example process followed by an artificial intelligence/machine learning (AI/ML) developer, according to some implementations.
Figure 6B:
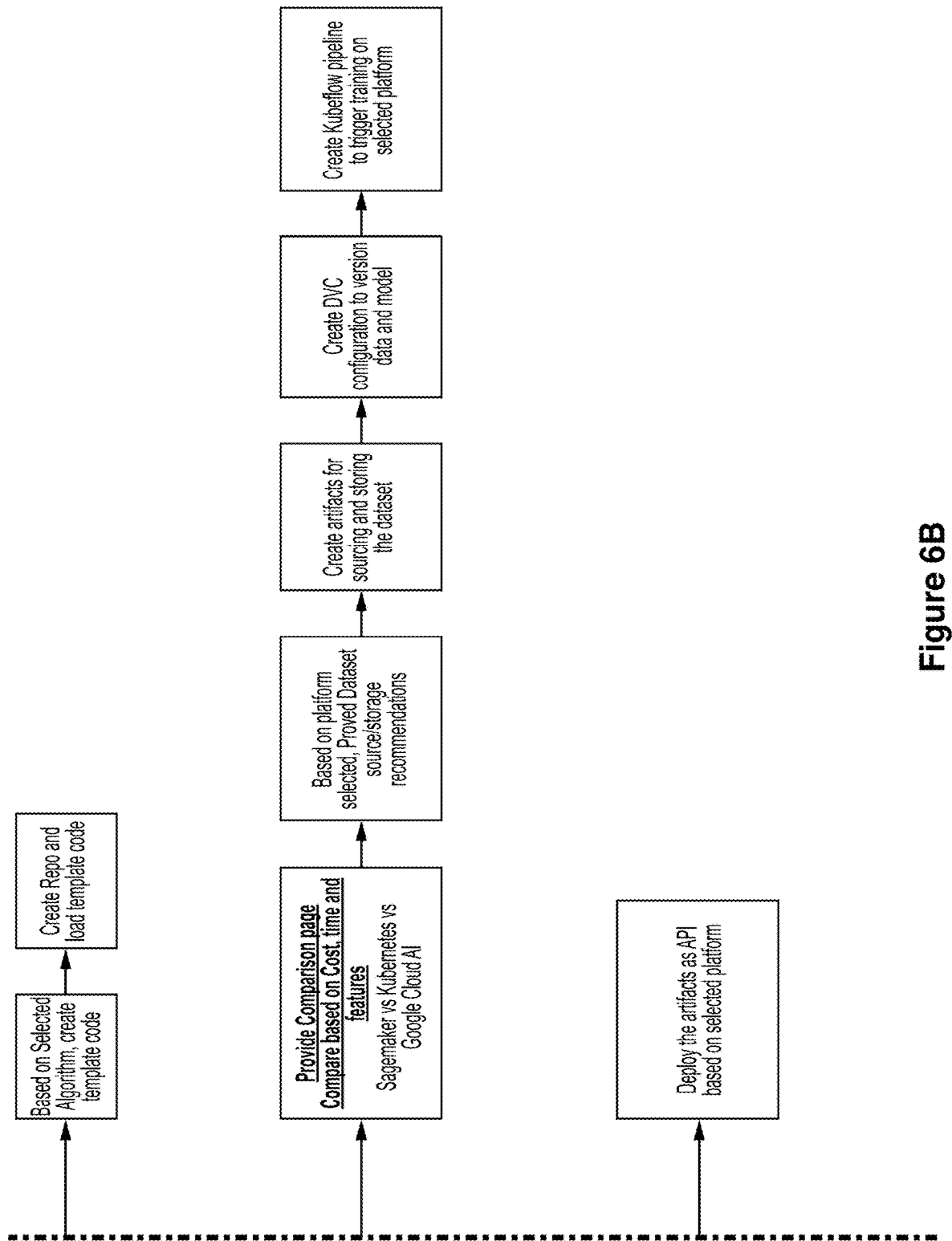

FIG. 6 shows an example process followed by an AI/ML developer, according to some implementations.

Figure 7:
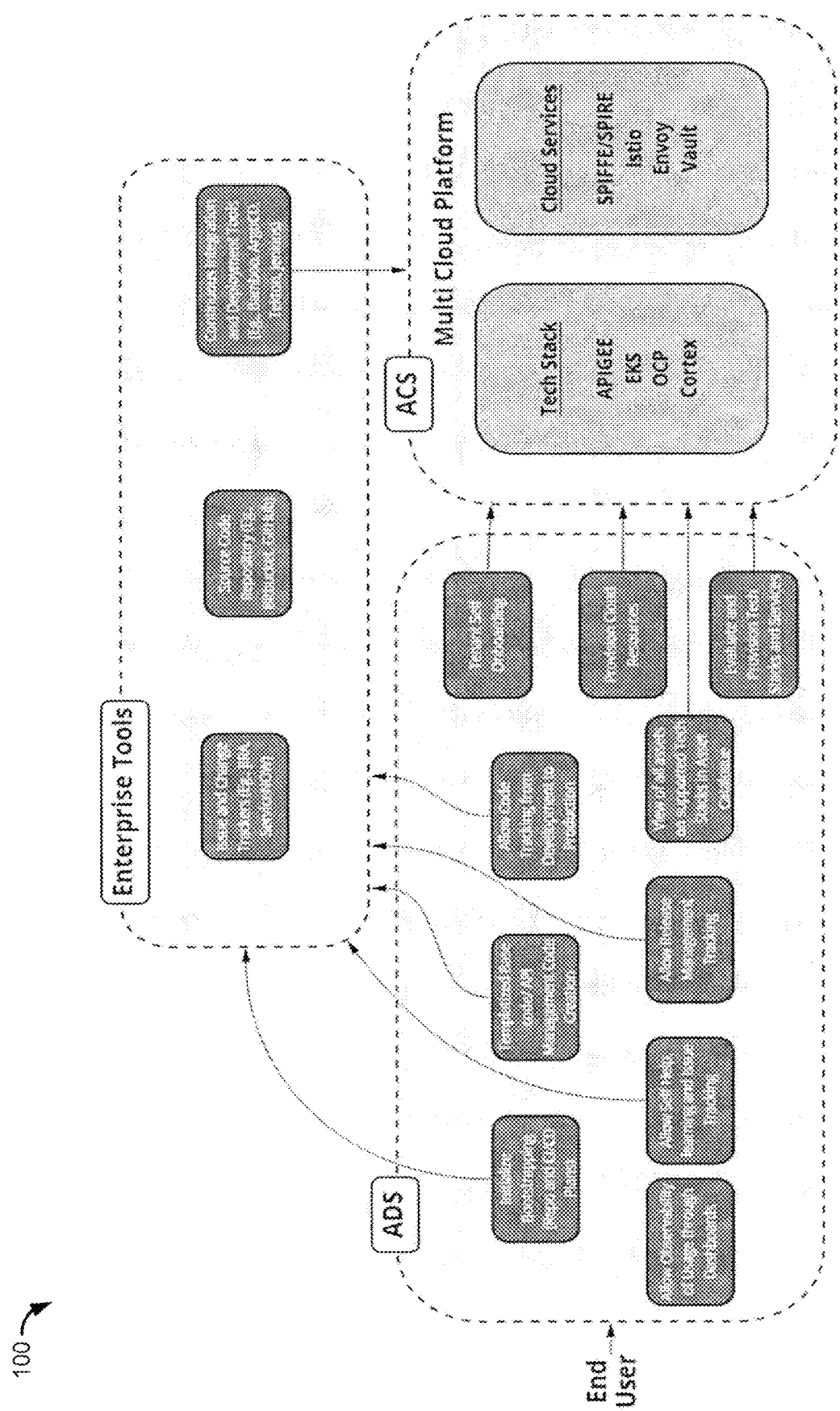
FIG. 7 is another illustration of the example Work Operating System 100 shown in FIG. 1A, according to some implementations.

FIG. 7 is another illustration of the example Work Operating System 100 shown in FIG. 1A, according to some implementations. One or more users may use system 100 as depicted in FIG. 7 to (i) be onboarded to get started and have access to needed platforms with an intuitive workflow, (ii) initiate bootstrapping connecting (where bootstrapping includes setting up a code repository and means to deploy an application to test and production environments with the Continuous Integration/Continuous Deployment (CI/CD) setup) behind the scenes to the Enterprise CI/CD tooling in the user's organization, (iii) use a verified standard template to create code in the technology stacks that are approved in the user's organization, (iv) allow members of the user's team to move the code through the environments seamlessly with approval tracking and tools and platform integration, (v) allow issue/change/release tracking with integration with an enterprise-approved issue tracker and baked-in approval and admin process, (vi) use services and provision assets on a multi cloud platform, and (vii) carry out asset view and management.

System 100 as depicted in FIG. 7 includes an ADS, ACS, and Enterprise Tools. Various modules in the ADS provide for the initializing of bootstrapping, templatized base code/API management code creation, code tracking from development to production, observability of usage through dashboards, self-help, learning, and issue tracking, release management tracking, views of all assets on supported tech stacks in an asset catalogue, tenant onboarding, provision cloud resources, and evaluation and provision of tech stacks and services.

The tenant self-onboarding, provision of cloud resources, views of all assets on supported tech stacks, and evaluation and provision of tech stacks and services depend on or otherwise interface with operations executed at the ACS, which is a multi-cloud platform including a tech stack and cloud services.

The initializing of bootstrapping, templatized base code/API management code creation, code tracking, self-help, learning, and issue tracking, and release management tracking use operations depend on or otherwise interface with operations executed with Enterprise Tools, including issue and change trackers, source code repository, and continuous integration and deployment tools. The continuation integration and deployment tools depend on or otherwise interface with tech stack and/or cloud services provided at the ACS.

Regarding initiating of bootstrapping, system 100 connects behind the scenes to the enterprise CI/CD tooling in the user's organization. The bootstrapping process sets up a code repository for the user. The code repository is hosted at the enterprise tools, since it depends on the enterprise. Example code repositories include Bitbucket or GitHub (although other code repositories may be implemented additionally or alternatively).

For example, if a user wants to build a new application and has a set of new team members, the user may want to build a website having a UI where users can log in work, and the website will be supported behind the scenes (using, e.g., a database and applications which will have some logic, Java, node, Python, or some other application). System 100 builds a plurality of different applications to support this website. In some implementations, one application is a database application (e.g., a Java application or pipe angular application for UI). System 100 creates the code repositories and obtains existing templates or base code (including, e.g., images or content that can be used at the beginning of the process of supporting the website, such as the first lines of code).

In some implementations, the user can select (e.g., from a drop-down menu) a desired technology stack. In response to the selection, system 100 starts developing the application, and much of the work that would have otherwise been done manually will be executed automatically by system 100. As an example, if the user selects a Java application, system 100 pulls a Java-based image which has been previously developed by engineering and other teams and has all the required observations, ability, and traceability parameters (e.g., how the application will be traced, whether it is scanned through, and so forth). System 100 automatically applies security standards and ensures the base image is adequate.

After the aforementioned pre-development operations, system 100 publishes the images so that the user can do the development and delivery within the approved standards of that particular organization. So if the developer picks that application, the developer will be prevented from pushing code into production which is not approved.

Upon creation of the application, system 100 automatically creates a new code repository depending on what the user wants to use. System 100 creates a wrapper and automatically generates boilerplate code. If continuous integration and continuous deployment is needed, system 100 sets up all of the configurations, and depending on the kind of deployment that is needed, system 100 supports continuous integration and continuous deployment toolings that the organization is using.

In some implementations, system 100 generates the required artifacts and assets in for a particular area, and once those are created system 100 takes the application boilerplate code and uses the continuous integration setup which it just created to build the application. System 100 then uses the continuous deployment path which it just created to deploy that code into the target environment or infrastructure the user is part of. The user may access the code from the repository and start writing the business logic, since all.

As such, the user may focus more on business logic, rather than having to be aware of all of the underlying code and behind-the-scenes configurations. Once the business logic is complete, the user may direct system 100 to migrate the code to a different environment (without interacting with other users). The code may proceed through a workflow for an approval. Upon approval, system 100 may deploy the code into a business user acceptance testing environment for further testing. The code may then proceed to pre-production testing, production and release.

As such, in addition to automation, system 100 generates boilerplate code (templates) and sets the relevant standards (corresponding to the application, user, organization, targeted environment, and so forth).

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of providing an integrated delivery platform for enterprise software development at a computing device including one or more processors and a memory storing instructions for execution by the one or more processors, the method comprising:
   receiving a request for a microservice;
   in response to receiving the request for the microservice, invoking a bootstrap workflow on an application developer suite (ADS);
   selecting a bootstrap workflow stage based on the requested microservice;
   wherein the selected bootstrap workflow stage includes at least one of:
      (i) automatic provisioning, by the ADS, of a source code repository to house development artifacts;
      (ii) provisioning, by the ADS, of a namespace and a sub-namespace in a secrets manager for centralized management of application-specific secrets;
      (iii) creating, by the ADS, a plurality of starter scripts to provision cloud resources leveraging one or more design patterns with one or more embedded security standards;
      (iv) provisioning, by the ADS, a new instance of a platform for deploying, managing, and scaling machine learning; and
      (v) orchestrating, by the ADS, with an automatic configuration server (ACS) to register a workload identifier and author one or more policies to support a zero-trust security model; and
   executing the selected bootstrap workflow stage at the ADS, wherein executing the selected bootstrap workflow stage comprises creating one or more predetermined templates based on a script or a template from a prior engagement with the ADS based on whether a type of software development is conventional or cognitive.

2. The method of claim 1, wherein receiving the request for the microservice includes:
   provisioning an account for a user on the ACS; and
   receiving the request for the microservice at the ACS via the provisioned account for the user.

3. The method of claim 1, wherein selecting the bootstrap workflow stage based on the requested microservice includes selecting the bootstrap workflow stage based on an application type of the requested microservice.

4. The method of claim 1, wherein selecting the bootstrap workflow stage based on the requested microservice includes selecting the bootstrap workflow stage based on a level of information sensitivity of the requested microservice.

5. The method of claim 1, wherein the selected bootstrap workflow stage includes automatic provisioning of a source code repository to house development artifacts, including initializing (i) a code repository and (ii) a secret store.

6. The method of claim 1, wherein the selected bootstrap workflow stage includes provisioning of a namespace and a sub-namespace in a secrets manager for centralized management of application-specific secrets, including performing one or more Open Policy Agent (OPA) enforcement operations.

7. The method of claim 1, wherein executing the selected bootstrap workflow stage comprises:
   initializing a bitbucket code repository and a secret store;
   creating one or more foundational templates;
   evaluating a technology stack to provision a Cortex platform; and/or
   creating one or more Continuous Integration (CI) or Continuous Deployment (CD) plans.

8. The method of claim 1, wherein executing the selected bootstrap workflow stage comprises:
   creating one or more deployment plans;
   creating one or more plans for continuous deployment for one or more cloud native applications;
   registering an identity; and/or
   performing one or more Open Policy Agent (OPA) enforcement operations.

9. The method of claim 1, further comprising, subsequent to executing the selected bootstrap workflow stage:
provisioning one or more cloud resources;
importing one or more skills from a trusted marketplace;
creating one or more subsequent deployment plans; and/or
performing one or more subsequent enforcement operations.

10. The method of claim 1, further comprising, subsequent to executing the selected bootstrap workflow stage:
storing the one or more predetermined templates in a repository of templates;
selecting a first template of the one or more predetermined templates from the repository of templates based on an application type; and
packaging application-specific logic for an application.

11. A system for providing an integrated delivery platform for enterprise software development at a computing device, the system comprising one or more processors and a memory storing one or more programs to be executed by the one or more processors, the one or more programs including instructions for:
receiving a request for a microservice;
in response to receiving the request for the microservice, invoking a bootstrap workflow on an application developer suite (ADS);
selecting a bootstrap workflow stage based on the requested microservice;
wherein the selected bootstrap workflow stage includes at least one of:
(i) automatic provisioning, by the ADS, of a source code repository to house development artifacts;
(ii) provisioning, by the ADS, of a namespace and a sub-namespace in a secrets manager for centralized management of application-specific secrets;
(iii) creating, by the ADS, a plurality of starter scripts to provision cloud resources leveraging one or more design patterns with one or more embedded security standards;
(iv) provisioning, by the ADS, a new instance of a platform for deploying, managing, and scaling machine learning; and
(v) orchestrating, by the ADS, with an automatic configuration server (ACS) to register a workload identifier and author one or more policies to support a zero-trust security model; and
executing the selected bootstrap workflow stage at the ADS, wherein executing the selected bootstrap workflow stage comprises creating one or more predetermined templates based on a script or a template from a prior engagement with the ADS based on whether a type of software development is conventional or cognitive.

12. The system of claim 11, wherein the instructions for receiving the request for the microservice include instructions for:
provisioning an account for a user on the ACS; and
receiving the request for the microservice at the ACS via the provisioned account for the user.

13. The system of claim 11, wherein the instructions for selecting the bootstrap workflow stage based on the requested microservice include instructions for selecting the bootstrap workflow stage based on an application type of the requested microservice.

14. The system of claim 11, wherein the instructions for selecting the bootstrap workflow stage based on the requested microservice includes instructions for selecting the bootstrap workflow stage based on a level of information sensitivity of the requested microservice.

15. The system of claim 11, wherein the selected bootstrap workflow stage includes automatic provisioning of a source code repository to house development artifacts, including initializing (i) a code repository and (ii) a secret store.

16. The system of claim 11, wherein the selected bootstrap workflow stage includes provisioning of a namespace and a sub-namespace in a secrets manager for centralized management of application-specific secrets, including performing one or more Open Policy Agent (OPA) enforcement operations.

17. The system of claim 11, wherein the instructions for executing the selected bootstrap workflow stage include instructions for:
initializing a bitbucket code repository and a secret store;
creating one or more foundational templates;
evaluating a technology stack to provision a Cortex platform; and/or
creating one or more Continuous Integration (CI) or Continuous Deployment (CD) plans.

18. The system of claim 11, wherein the instructions for executing the selected bootstrap workflow stage include instructions for:
creating one or more deployment plans;
creating one or more plans for continuous deployment for one or more cloud native applications;
registering an identity; and/or
performing one or more Open Policy Agent (OPA) enforcement operations.

19. The system of claim 11, wherein the one or more programs further include instructions for, subsequent to executing the selected bootstrap workflow stage:
provisioning one or more cloud resources;
importing one or more skills from a trusted marketplace;
creating one or more subsequent deployment plans; and/or
performing one or more subsequent enforcement operations.

20. The system of claim 11, wherein
the one or more programs further include instructions for, subsequent to executing the selected bootstrap workflow stage:
storing the one or more predetermined templates in a repository of templates;
selecting a first template of the one or more predetermined templates from the repository of templates based on an application type; and
packaging application-specific logic for an application.

* * * * *